March 15, 1938. J. B. CATLIN 2,111,205
COMPOSITE SHEET ARTICLE
Filed Jan. 6, 1936
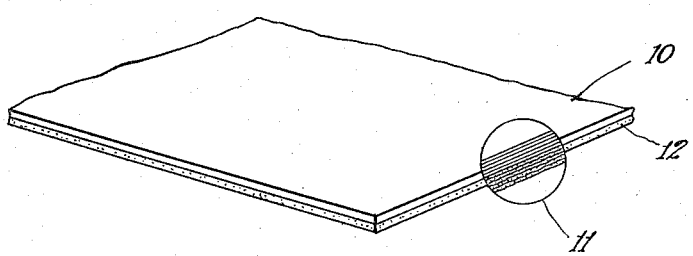
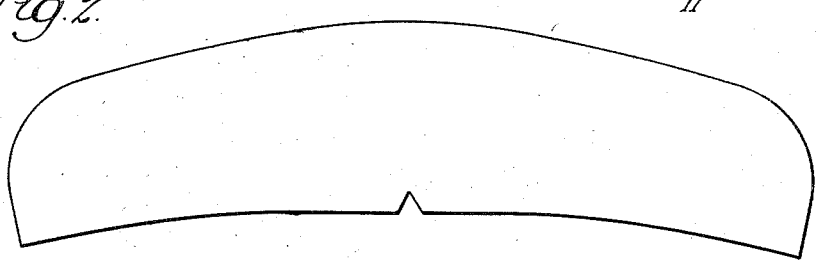
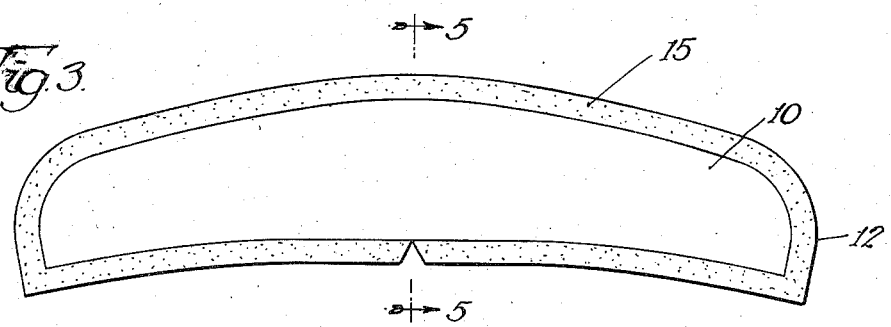
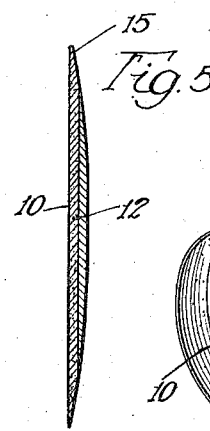
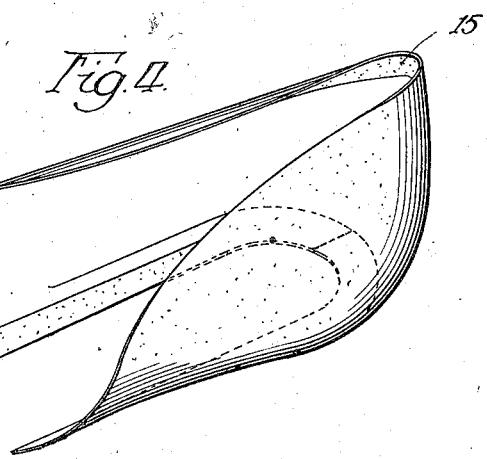
Inventor
John B. Catlin
By: Fisher, Clapp, Soans & Pond. Attys.

Patented Mar. 15, 1938

2,111,205

UNITED STATES PATENT OFFICE 2,111,205

COMPOSITE SHEET ARTICLE

John B. Catlin, Appleton, Wis., assignor to Paper Patents Company, Neenah, Wis., a corporation of Wisconsin Application January 6, 1936, Serial No. 57,677

6 Claims. (Cl. 36—68)

My invention relates to articles which must be relatively stiff in the interior portions thereof and which require a marginal flange of relatively flexible and resilient material. I have found that such an article can be produced conveniently and economically by forming a composite sheet having a layer of stiff material, such as fiber board or the like, and a closely adherent layer of a different material which is relatively flexible and resilient, the latter ply extending beyond the former to provide a flexible and resilient flange. The different materials of which the composite sheet is constructed are preferably of such character and so united that the composite sheet may be formed or molded into any desired shape or contour.

One special application of my invention is in shoe counters, but other industrial applications of my invention may possibly suggest themselves to those skilled in the art.

In the appended drawing forming a part of this specification and illustrating certain preferred embodiments of my invention:—

Figure 1 is a perspective view of a composite sheet of laminated material manufactured in accordance with my invention, a portion thereof being magnified to show the structure more clearly;

Figure 2 is a plan view of a blank of a shoe counter cut from the material represented in Figure 1;

Figure 3 is a similar view of said blank at a further stage in the process of manufacturing;

Figure 4 is a perspective view of a finished shoe counter embodying my invention, and Figure 5 is a sectional view taken substantially along the line 5—5 of Figure 3.

In practicing my invention, I produce a composite sheet, as shown in Figure 1, comprising a sheet 10 of fiber board or kraft board, which may be made in accordance with principles well known in the art. The fiber board 10 is secured by suitable cement, such as sodium silicate, latex, etc., to a ply 12 of artificial leather of high flexibility and resilience, and for this purpose I preferably use a material manufactured in accordance with Sewall Patent No. 1,915,339, dated June 27, 1933. Such material is formed by superposing a plurality of gossamer-like cellulosic plies or sheets into a pad or bat, impregnating the pad or bat, as by spraying or the like, with rubber latex, and then compacting the impregnated pad or bat.

According to one embodiment of my invention, in the finished board shown in Figure 1, the fiber sheet 10 and the artificial leather sheet each have a thickness of approximately .045 to .060 inch.

The composite sheet shown in Figure 1 has two very important qualities: The fiber board 10 has great stiffness, while the artificial leather portion 12 has much greater resilience and flexibility. Therefore, such a material is extremely useful where a combination of these qualities is desired and especially where stiffness is required in the interior of a sheet article, while flexibility is desirable in the marginal portions thereof.

Such a combination of properties is desirable in a shoe counter. In such an article, stiffness is required in order to maintain the shape of the heel portion of the shoe, while flexibility and resilience are required around the edges of the counter in order that the shoe may fit snugly to the foot of the wearer and will not crack or permanently lose its shape when distorted, as, for example, when an Oxford shoe or slipper is put on without the use of a shoe horn. Both of such qualities are possessed to a certain degree by leather, but such material is expensive and, furthermore, is subject to deterioration as a result of perspiration and climatic effects. Fiber board, which has been substituted for leather in cheap shoes, completely fails to provide the desired flexibility at the margins, being excessively stiff and subject to cracking. Artificial leather embodying the Sewall invention has the desired properties, but when used in a thickness necessary to provide the required stiffness, is too expensive for use in the cheaper grades of shoes.

Composite sheet material made in accordance with my invention, however, seems to meet all of the requirements both as to quality and price.

In order to provide the maximum flexibility at desired points, after a blank, as shown in Figure 2 has been formed from the sheet material of Figure 1, the fiber sheet 10 is skived off adjacent the margins in order to provide a feather-edged flange 15 which will consist almost entirely of the artificial leather 10, as shown in the section of Figure 5. This will provide a blank as shown in Figure 3, which may be formed in the usual way by dies or other suitable tools into a finished counter, as shown in Figure 4.

It will be seen that an article produced as described above will have all of the required properties which I have enumerated. By reason of the fiber layer 10, it will possess the stiffness required to maintain the shape of the shoe heel, while the feather edge 15 of artificial leather will provide the necessary flexibility and resilience, so that the shoe will hug the heel of the wearer, will yield when the same is put on or taken off, and will quickly spring back to normal shape after distortion, while at the same time it will stand a substantial amount of abuse without losing its shape, as, for example, when a shoe is put on without the use of a horn.

It is intended that the scope of my invention shall be determined by the appended claims, which should be interpreted as broadly as the state of the art will permit.

I claim as my invention:

1. A shoe counter comprising a ply of fiber board secured to a ply of rubber-impregnated cellulosic material having relatively high flexibility and resilience, the latter extending beyond the former to form a free marginal flange.

2. A shoe counter comprising a ply of fiber board secured to a ply of rubber-impregnated cellulosic material having relatively high flexibility and resilience, the latter extending beyond the former to form a free marginal flange, and the fiber board being beveled adjacent its edge so as to form a continuous surface between said material and said flange.

3. A shoe counter comprising a ply of fiber board secured to a ply of rubber-impregnated cellulosic material having relatively high flexibility and resilience, the latter extending beyond the former to form a free marginal flange, the fiber board being beveled adjacent its edge so as to form a continuous surface between said material and said flange, and the rubber-impregnated ply being beveled to form a feather edge.

4. A composite sheet article particularly suitable for use in making shoe counters comprising a backing ply formed of felted and compacted cellulosic fibers which have been impregnated, prior to the compacting thereof, with a binder containing rubber in sufficient amounts to cause said ply to possess substantially the same physical characteristics of high flexibility and resilience as leather, and a stiffening ply permanently secured to said backing ply, said stiffening ply being formed of felted and compacted cellulosic fibers which have been impregnated with a substance which renders said stiffening ply much stiffer than said backing ply, said backing ply extending beyond said stiffening ply to form a free marginal flange.

5. A composite sheet article particularly suitable for use in making shoe counters comprising a backing ply of an artificial leather formed from felted and compacted cellulosic fibers which have been impregnated, prior to the compacting thereof, with a binder containing rubber in sufficient amounts to cause said ply to possess substantially the same physical characteristics of high flexibility and resilience as leather, and a stiffening ply of relatively stiff fiber-board permanently secured to said backing ply, said plies being of substantially the same thickness, and said backing ply extending beyond said stiffening ply to form a free marginal flange, said fiber-board ply being beveled adjacent its edge to form a continuous surface between that ply and said stiffening ply, and said stiffening ply being similarly beveled to form a feather edge.

6. A composite, multi-ply sheet article particularly intended for use in making shoe counters comprising a backing ply formed from a sheet of flexible, resilient, artificial leather which consists of a plurality of superposed, gossamer-thin, cellulosic sheets which have been impregnated with a rubber binder and then compacted, and a stiffening ply comprising a relatively stiff sheet of compacted cellulosic material permanently attached to said backing ply, said backing ply extending beyond said stiffening ply to form a free marginal flange.

JOHN B. CATLIN.